United States Patent [19]
Toyoshima et al.

[11] Patent Number: 5,652,628
[45] Date of Patent: Jul. 29, 1997

[54] METHOD AND APPARATUS FOR DISPLAYING BROADCAST SIGNALS AND STATION INFORMATION

[75] Inventors: Kenichiro Toyoshima; Hirofumi Usui, both of Tokyo, Japan

[73] Assignee: Sony Corporation, Tokyo, Japan

[21] Appl. No.: 501,404

[22] Filed: Jul. 12, 1995

[30] Foreign Application Priority Data

Jul. 12, 1994 [JP] Japan .................................. 6-182743

[51] Int. Cl.$^6$ .................................................. H04N 5/45
[52] U.S. Cl. ................................. 348/569; 348/563
[58] Field of Search ........................... 358/183, 22, 192.1; 348/563, 564, 565, 569, 570, 588; 455/185.1; H04N 5/45, 5/50, 5/445, 5/44

[56] References Cited

U.S. PATENT DOCUMENTS

| | | | |
|---|---|---|---|
| 5,301,028 | 4/1994 | Banker et al. | 455/185.1 |
| 5,398,074 | 3/1995 | Duffield et al. | 348/569 |
| 5,512,955 | 4/1996 | Toyoshima et al. | 348/569 |

FOREIGN PATENT DOCUMENTS

| | | | |
|---|---|---|---|
| 0148443 | 8/1984 | Japan | 358/142 |
| 0250727 | 12/1985 | Japan | 358/192.1 |
| 0328244 | 12/1993 | Japan | H04N 5/45 |
| 0054269 | 2/1994 | Japan | H04N 5/44 |
| 0165055 | 6/1994 | Japan | H04N 5/44 |

*Primary Examiner*—David E. Harvey
*Attorney, Agent, or Firm*—Pasquale Musacchio; Jerry A. Miller

[57] ABSTRACT

A television signal receiving apparatus which receives, analyzes and displays an information signal which is multiplexed onto a broadcasting wave and transmitted, and through the resulting information which has been obtained by analysis of the continuously stored information signal can display the information in such a way as to be related to the image information which corresponds to an associated one of a number of broadcasting channels. In this way a television signal receiving apparatus which is convenient for a user can be realized.

6 Claims, 11 Drawing Sheets

| ①ABC | ②NBC | ③CBS |
|------|------|------|
| ④PBS | ⑤FOX | ⑥CNN |
| ⑦KTTY | ⑧KUSI | ⑨XEWT |

| ABC | NBC | CBS |
|-----|-----|-----|
| PBS | FOX | CNN |
| KTTY | KUSI | XEWT |

METHOD AND APPARATUS FOR DISPLAYING BROADCAST SIGNALS AND STATION INFORMATION

BACKGROUND OF THE INVENTION

1. Related Applications

Applications relating to this invention have been proposed by the same applicant in Japanese Application Nos. 05-270070 filed Oct. 2, 1993; 05-292746 filed Oct. 28, 1993; 05-350425 filed Dec. 31, 1993; and 06-219493 filed Aug. 22, 1994) (Each of the above applications is owned by the assignee of the present invention and is incorporated by reference herein.).

2. Field of the Invention

This invention relates to a television signal receiving apparatus, and more particularly, to a television set which is able to receive a number of broadcast channels.

DESCRIPTION OF THE RELATED ART

In a television signal receiving apparatus, heretofore, an "up-down" type of operation key is pushed as a way to set or change each of a number of received broadcasting channels, so that the receiving channel is changed in accordance with a previously registered sequence or the reverse order of it. In addition to this method, there is a method of displaying on the screen, character information such as the broadcasting stations' names. When the operation key having positions corresponding to the displayed position are pushed (e.g. operation keys of a remote control device, etc.) the associated channel is changed.

However, in a television signal receiving apparatus thus constructed, character information such as the broadcasting stations' names corresponding to the selected channels are required to be displayed on the screen. For example, such a technique has been disclosed in Japanese Laid Open Patent No. 56-136089, in which a multi-screen is divided into nine areas, (3×3) so that each of the nine sub-screens is displayed at the same time and the channel number previously stored in a channel storing circuit is superimposed on each sub-screen.

More specifically, a channel selection screen 20 as shown in FIG. 1 is displayed on the display screen. With respect to display area 21, broadcasting stations' names etc. and the corresponding numbers have been displayed on a channel selection screen 20. A user selects the number which corresponds to the broadcasting station's name by pushing a operation key 24 such as of a remote commander 23 (FIG. 2). In this connection, the numbers which have been displayed on a number display area 22 in the channel selection screen 20 are displayed such that they correspond to the operation keys 24 of the remote commander 23. However, this requires a complicated operation, as the user must think or look up the proper character information (broadcasting station's name etc.) for each channel and then register it one character at a time.

A similar technique for displaying a selection such as a television channel in order to select it has been disclosed in U.S. Pat. No. 4,746,983.

SUMMARY OF THE INVENTION

In view of the foregoing, an object of this invention is to provide a television signal receiving apparatus which is convenient to use.

The foregoing object and other objects of the invention have been achieved by the provision of a television signal receiving apparatus which includes: a receiver for receiving information signals which are multiplexed onto a predetermined broadcasting wave and then transmitted; a display for displaying image information corresponding to a number of broadcasting channels which are transmitted as broadcast waves; an analyzer for analyzing the information signals and for extracting the predetermined information; a storage device for storing the information which has been extracted by the analyzer; wherein the information which has been obtained from the information signals is stored in the storage unit, so that the information is displayed in such a manner that the information is superimposed upon the image information displayed on the display.

Further, according to the present invention, the broadcast waves can be transmitted via air, cable, or similar such means of transmission. Additionally, in the present invention, the information can be received via an information offering dedicated channel.

Moreover, in the present invention, the information signal is preferably composed of information which is related to the contents of a broadcast program, and the image information which corresponds to the channel having the information related to these program contents is displayed on the display.

Furthermore, in the present invention, the information signal is composed of information which is related to the program contents, and the image information corresponding to broadcasting channels other than the broadcasting channel having this program content information is not displayed on the display. Alternatively, the display brightness of such information may be reduced.

Moreover, in the present invention, the display means displays the information which represents the types of programs.

Additionally, in the present invention, the storage device stores the broadcast channel number at certain specified times for a predetermined duration, collects statistics relating to it, and then displays the image information corresponding to the broadcast channel which has a high usage frequency based on these statistical results.

Furthermore, the apparatus of the present invention preferably includes an external receiver means for receiving information signals which are multiplexed onto the predetermined broadcasting wave and transmitted, wherein the information signals are outputted without passing through the external receiver. Preferably, the external receiver constantly analyzes, and stores or updates the information signals, using a free or dedicated channel selecting unit and an analyzer.

In the television signal receiving apparatus which receives, analyses and displays the information signals which are multiplexed onto the predetermined broadcasting wave and transmitted, the information which has been obtained by analysis of the information signals is stored; therefore the information can be displayed in such a way as to relate to the image information which corresponds to the number of broadcasting channels. Thus, a television signal receiving device which is convenient to use can be realized.

The nature, principle and utility of the invention will become more apparent from the following detailed description when read in conjunction with the accompanying drawings in which like parts are designated by like reference numerals or characters.

BRIEF DESCRIPTION OF THE DRAWINGS

FIGS. 12A and 12B are schematic diagrams showing the channel selecting display screens according to other embodiments of the present invention.

DETAILED DESCRIPTION OF THE EMBODIMENT

Preferred embodiments of the present invention will be described with reference to the accompanying drawings:

(1) General Construction of the Television Signal Receiving Apparatus

Figure 4:
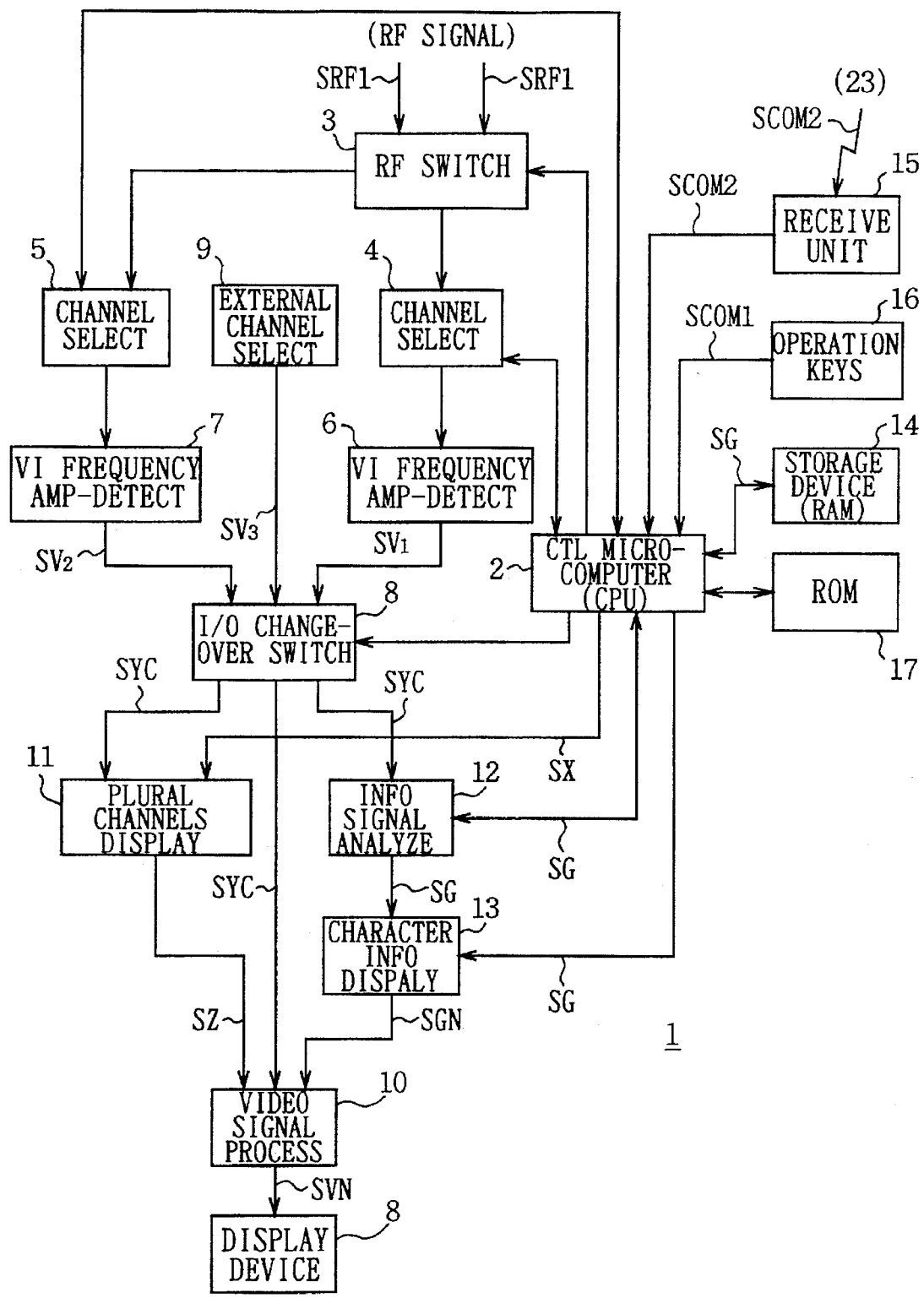
FIG. 4 is a block diagram showing a television signal receiving apparatus according to the present invention.

Referring to FIG. 4, a television signal receiving apparatus is generally designated by the reference number 1. A broadcast wave which is transmitted via air CRF signal SRF1) or a broadcast wave which is transmitted via cable (RF signal SRF2) is switched so as to be input at an RF switch circuit 3, the switching of which is preferably controlled by a controlling micro-computer (CPU) 2. The selected input RF signal SRF1 or SRF2 is then sent to a channel selecting circuit 4 or 5.

The channel selecting circuit 4 or 5, both of which are also controlled by the CPU 2, extracts a signal of a channel which has been selected by the user, and then sends it to a video intermediate frequency amplify-detect circuit 6 or 7, respectively, as an intermediate frequency signal. The video intermediate frequency amplify-detect circuit 6 or 7 generates a video signal SV1 or SV2, respectively, and then sends this signal to an input/output change-over switch circuit 8.

The input/output change-over switch circuit 8, which is also controlled by the CPU 2, transforms the video signal SV1 or SV2 and the video signal SV3 (which is sent from a external channel selecting device 9) into a luminance signal and a chrominance signal by means of a comb filter, and then sends this as a video signal SYC to a video signal processing circuit 10, a multiple channel display circuit 11, and an information signal analyzing circuit 12.

In the case where a number of channels are displayed, the CPU 2 sequentially inputs the video signals SYC to the multiple channel display circuit 11 in such a manner that the video signals SYC are shifted for predetermined time periods, by controlling the channel selecting circuit 4 or 5. On the basis of a control signal SX which is output from the CPU 2, the multiple channel display circuit 11 sequentially stores the sequentially input video signals SYC in a memory address (a built-in storage device (not shown) of the multiple channel display circuit 11) which corresponds to the display position located on the display screen (not shown) respectively for each channel. When recording of the preset predetermined number of channels has been completed, the system is returned to the first recorded channel and then records are updated.

Thus, the multiple channel display circuit 11 interprets the sequentially recorded number of video signals SYC as a group of video signals for one screen, and outputs them to the video signal processing circuit 10 as an image display position signal SZ for indicating the display position located on the display screen of each video signal group.

Figure 5A:
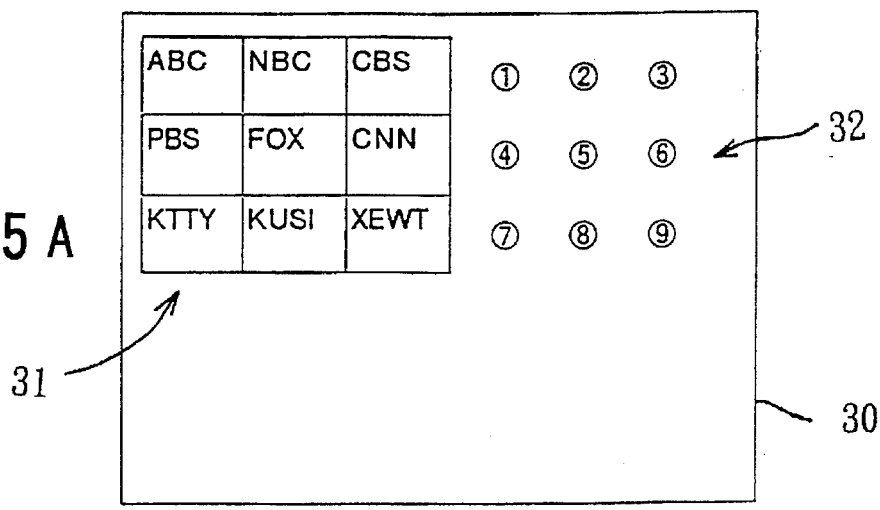
FIGS. 5A to 5C are schematic diagrams showing the channel selecting display screens according to the present invention.
Figure 5B:
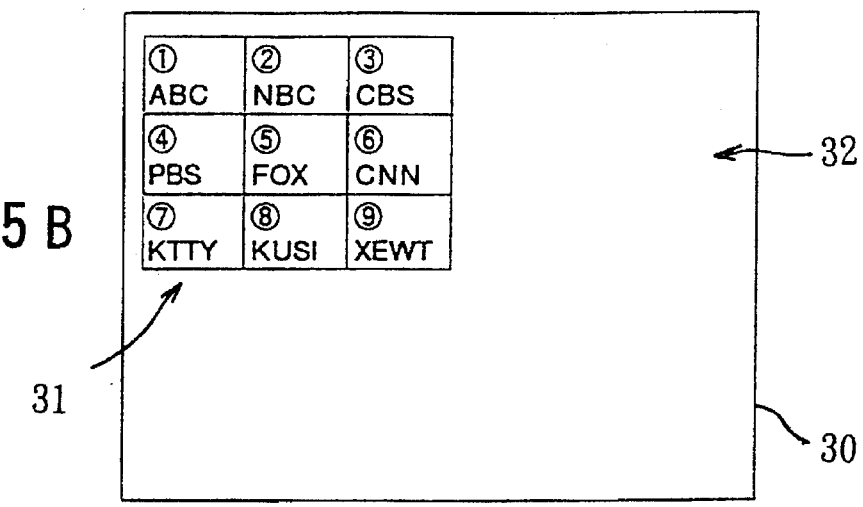
Figure 5C:
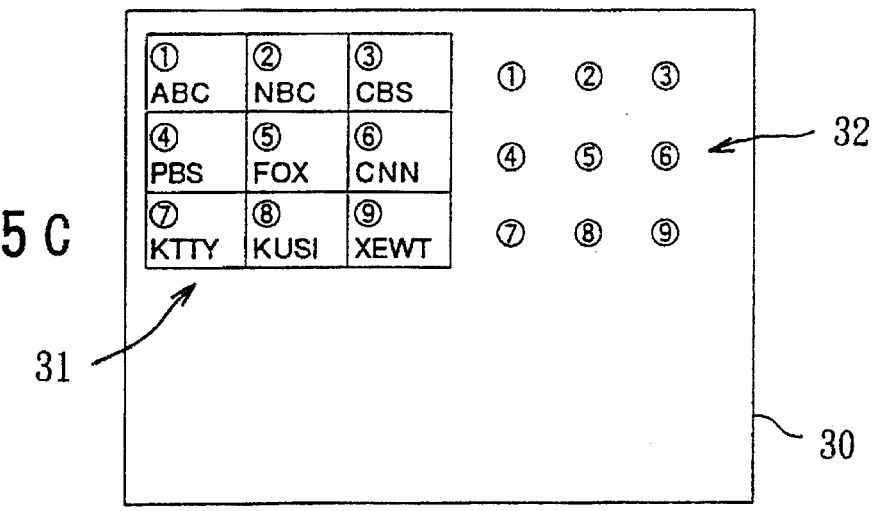

A selection screen 31 shown in FIGS. 5A to 5C is superimposed on a part of the whole screen 30 as a sub-screen. The selection screen 31 is displayed as a multi-subscreen which is preferably divided into nine areas, (3×3) wherein each image of a different channel is displayed on each of the divided nine subscreens as a time-lapse image. Of course, it will be understood that the number of sub-screens displayed may be varied.

A memory addressing technique for displaying a plurality of motion picture simultaneously by using a multi-screen divided into a plurality of screens, has been disclosed in Japanese Patent Laid Open No. 56-136089 referenced above. Hence, the detailed description of the memory addressing is omitted here.

The information signal analyzing circuit 12 extracts a information signal SG from the video signal SYC, and transforms this into data of the type which can be processed by a character information displaying circuit, and then sends it to such a character information displaying circuit 13. At the same time, the information signal analyzing circuit 12 sends the information signal SG to the CPU 2, and the CPU 2 in turn writes the information signal SG in a storage device (RAM) 14 as necessary.

A command signal SCOM1 which is sent from an operation key 16 and a command signal SCOM2 which is sent from a remote commander 23 (FIG. 2) via a receiving unit 15, are both input to the CPU 2. The CPU 2 performs a control operation in accordance with a program which is stored in ROM 17, on the basis of the command signal SCOM1 or SCOM2.

The character information displaying circuit 13 is also controlled by the CPU 2. This circuit 13 generates an information signal SGN which can be multiplexed onto the video signal SYC, on the basis of: an information signal SG, said signal SG either being from the information signal analyzing circuit 12 output, the signal recorded in the storage device 14, or the signal which is comprised of the character information (voice, channel, etc.) read from the ROM 17 by the CPU 2; and, on the basis of the position information for displaying the character information. The circuit 13 then sends this signal SGN to the video signal processing circuit 10.

The video signal processing circuit 10 superimposes the information signal SGN, (which is output from the character information displaying circuit 13), upon the video signal SYC, (which is output from the input/output change-over switch circuit 8), and an image displaying position signal SZ, (which is output from the multiple channel display circuit 11), and performs image processing. The circuit 10 then outputs this to a display device (CRT) 18 as a display video signal SVN which is comprised of RGB signals.

Thus, the television signal receiving apparatus 1 is adapted to write information in the storage device 14 using the CPU 2, in which the information has been extracted from the information signal SG which has been coded and multiplexed with the broadcasting signal (SRF1, SRF2) etc. or from the information signal SG which has been sent through the information dedicated channel. The television signal receiving apparatus 1 is further adapted to utilize this information so as to display the images of the number of channels and also to display the broadcasting-station's name etc. in such a manner that it corresponds to the image display position of each channel.

(2) Channel Selection and Display Processing by the CPU

In the case where images of the channels are to be displayed, the CPU 2 performs the screen display processing as discussed below.

Figure 2:
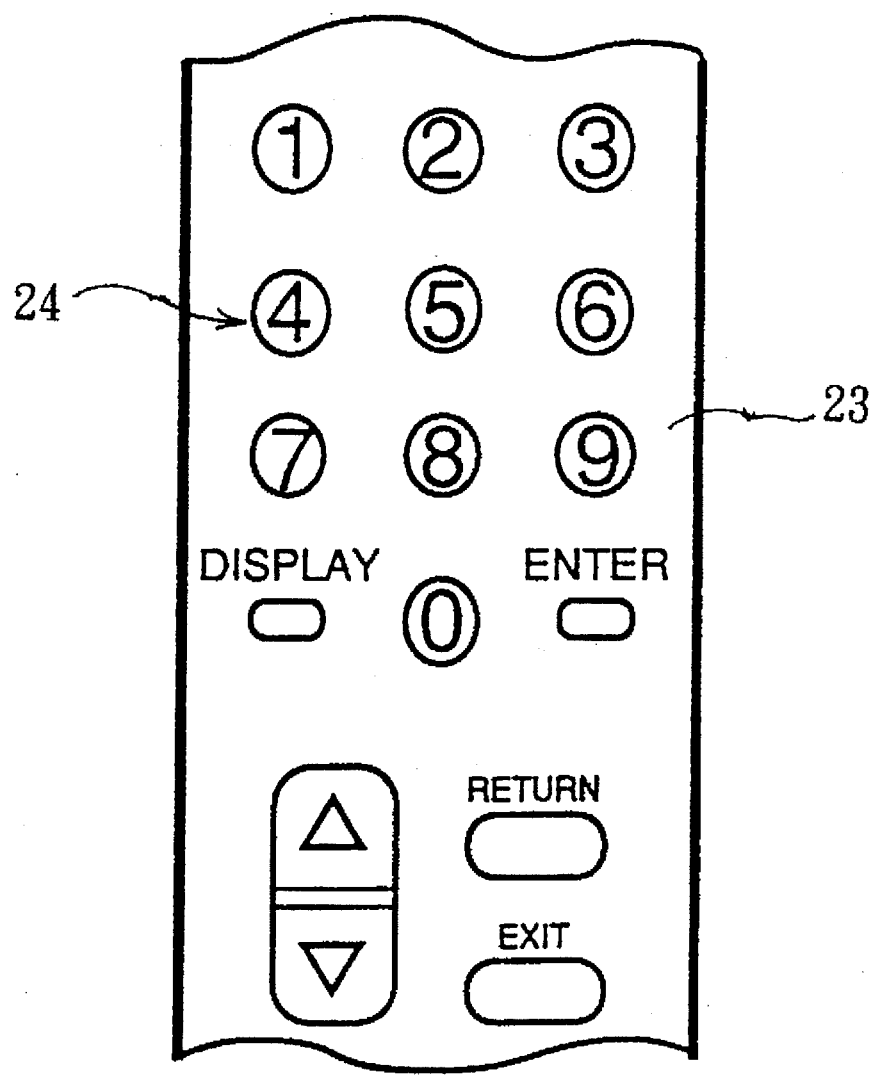

The CPU 2 is able to display the character information such as broadcasting station's name etc. upon the image display position of each channel on the display screen 30 of the display device 18, in such a way as to superimpose it upon the displayed image. As shown in FIGS. 5A to 5C through FIGS. 7A to 7C, a channel selection screen (multi-subscreen) 31 and a character information display portion 32 are displayed on the display screen (main screen) 30 of the displaying device 18. This channel selection screen 31 is preferably comprised of nine subscreens of 3 columns×3 rows. In these nine subscreens, the selected channels are allocated and the images are displayed respectively, and the broadcasting stations' names and/or the corresponding operation key numbers or channel numbers are also displayed in such a manner that they are superimposed on the respective image displays. In addition, in the character information display portion 32, the broadcasting stations' names and/or the corresponding operation key numbers or channel numbers are preferably displayed in such a manner that they correspond to the operation keys 24 of the remote commander 23 (FIG. 2).

In operation, the CPU 2 first reads the information of the registered positions and the registered channels which have been determined by the user and written into the storage device 14, and controls the channel selecting circuit 4 or 5 according to FIG. 4. The images of the channels are displayed upon the channel selection screen 31 on the display screen 30, on the basis of the video signal SYC which is output from the input/output change-over switch circuit 8, and the image displaying position signal SZ which is output from the multiple channel display circuit 11.

Next, the CPU 2 reads the character information which has been written in the storage device 14 and which corresponds to each channel, and then combines the character information etc. with the abovementioned information of the registered positions and the registered channels which have been determined by the user. The combined information is sent to the character information displaying circuit 13 along with the character information and the position information of the position for displaying it which have been read from the ROM 17. The character information displaying circuit 13 in turn sends the information signal SNG to the video signal processing circuit 10 on the basis of this information.

The video signal processing circuit 10 superimposes the information signal SGN on the video signal SYC and the image displaying position signal SZ, so that the predetermined character information etc. can be displayed on the channel selection screen 31 and the character information display portion 32 in the display device 18, in such a manner that it is superimposed upon the displayed images of the channels which have been displayed on the channel selection screen 31.

By actuation of an operation key 24 of the remote commander 23 (FIG. 2) while looking at the character information which is represented by the predetermined combinations of the broadcasting stations' names or the corresponding channel numbers and operation key numbers which have been displayed on the channel selection screen 31 and the character information display portion 32, the user is able to specify the character information. As a result, the CPU 2 is able to change the channel by reading the channel number which corresponds to the specified operation key 24 from the storage device 14 and then controlling the channel selecting circuit 4 or 5.

It will be appreciated that there exists numerous and varied permutations of the display of the character information and that the display of the present invention is not limited to the embodiments shown herein. In FIGS. 5A to 5C through FIGS. 7A to 7C, the aspects of the display of the channel selection screen 31 and the character information display portion 32 on the display screen 30 are shown. FIG. 5A shows the case where the broadcasting stations' names have been displayed on the channel selection screen 31 and the operation key numbers have been displayed on the character information display portion 32. FIG. 5B shows the case where the broadcasting stations' names and the corresponding operation key numbers have been displayed on only the channel selection screen 31. FIG. 5C shows the case where the operation key numbers have been displayed on the character information display portion 32, in addition to the display of FIG. 5B.

Figure 6A:
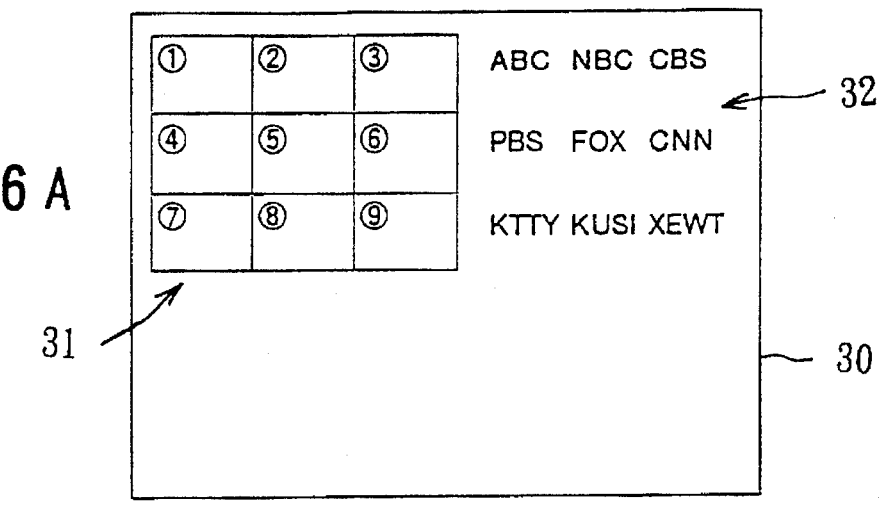
FIGS. 6A to 6C are schematic diagrams showing the channel selecting display screens according to the present invention.
Figure 6B:
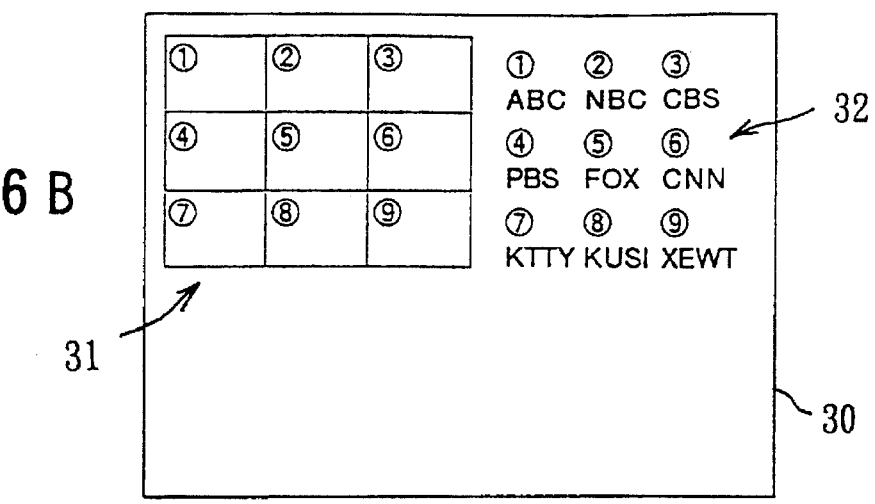
Figure 6C:
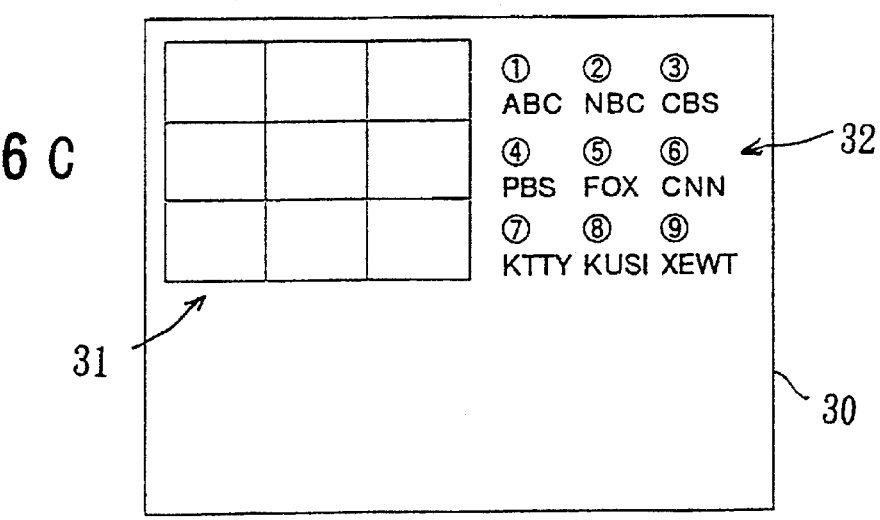

FIG. 6A shows the case where the operation key numbers have been displayed on the channel selection screen 31 and the broadcasting stations' names have been displayed on the character information display portion 32. FIG. 6B shows the case where the operation key numbers have been displayed on the channel selection screen 31 and the broadcasting stations' names and the corresponding operation key numbers have been displayed on the character information display portion 32. FIG. 6C shows the case where the broadcasting stations' names and the corresponding operation key numbers have been displayed on only the character information display portion 32.

Figure 7A:
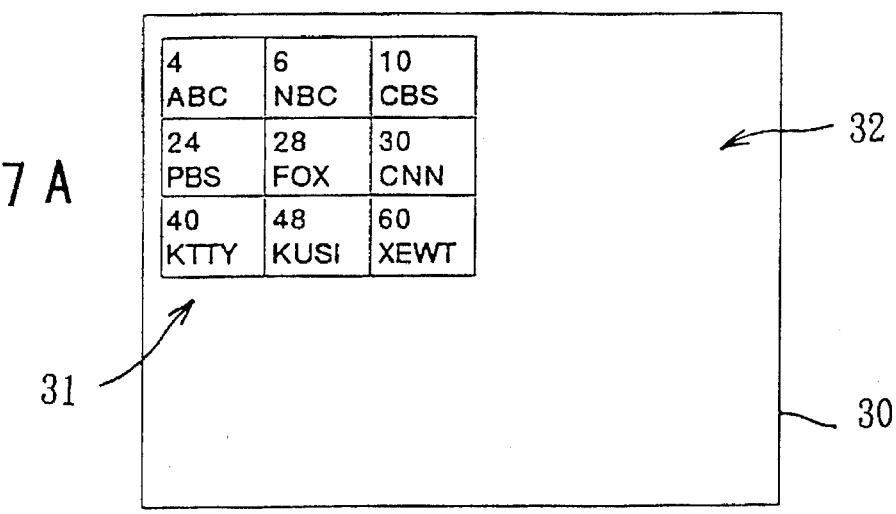
FIGS. 7A to 7C are schematic diagrams showing the channel selecting display screens according to the present invention.
Figure 7B:
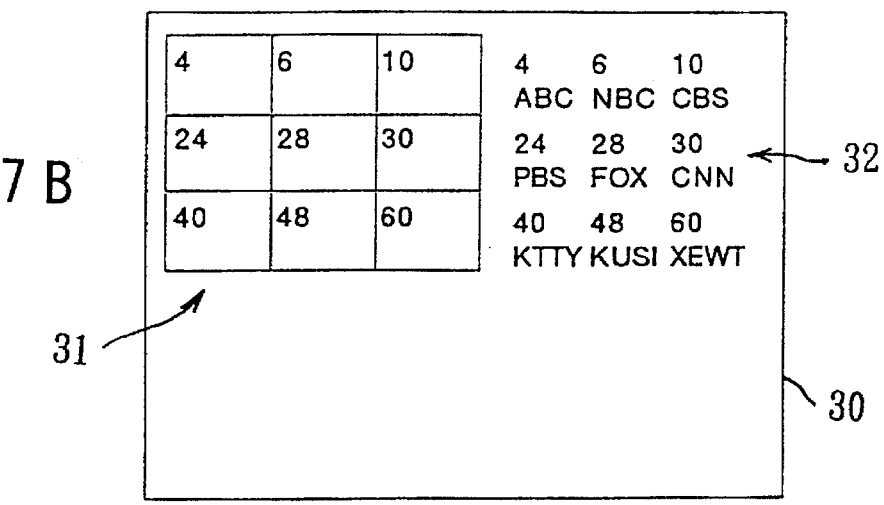
Figure 7C:
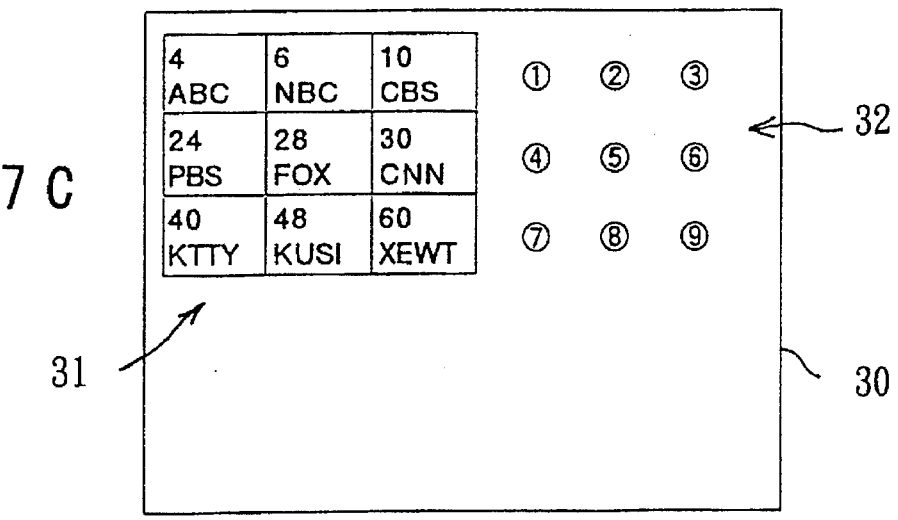

FIG. 7A shows the case where the broadcasting stations' names and the corresponding channel numbers have been displayed on only the channel selection screen 31. FIG. 7B shows the case where the channel numbers have been displayed on the channel selection screen 31 and the broadcasting stations' names and the corresponding channel numbers have been displayed on the character information display portion 32. FIG. 7C shows the case where the operation key numbers have been displayed on the character information display portion 32, in addition to the display of FIG. 7B.

(3) Program Detection Processing by the CPU

In the case where information is transmitted which relates to the contents of the programs and is contained in the information taken out from the coded information which has been multiplexed onto the broadcasting wave etc., or from the information signal which has been transmitted through the information dedicated channel, the CPU 2 is able to determine from the number of channels transmitted, the channels which corresponds to the type of program which has been selected and specified by the user. The CPU can then cause them to be displayed on the display screen 30 of the display device 18, by performing the following program detection processing.

Figure 8A:
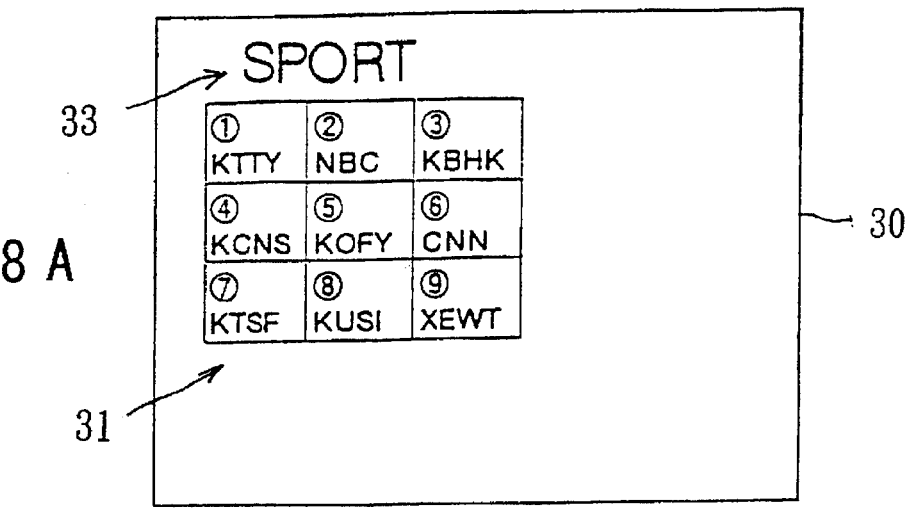
FIGS. 8A to 8C are schematic diagrams showing the channel selecting display screens at the time of program detection processing.
Figure 8B:
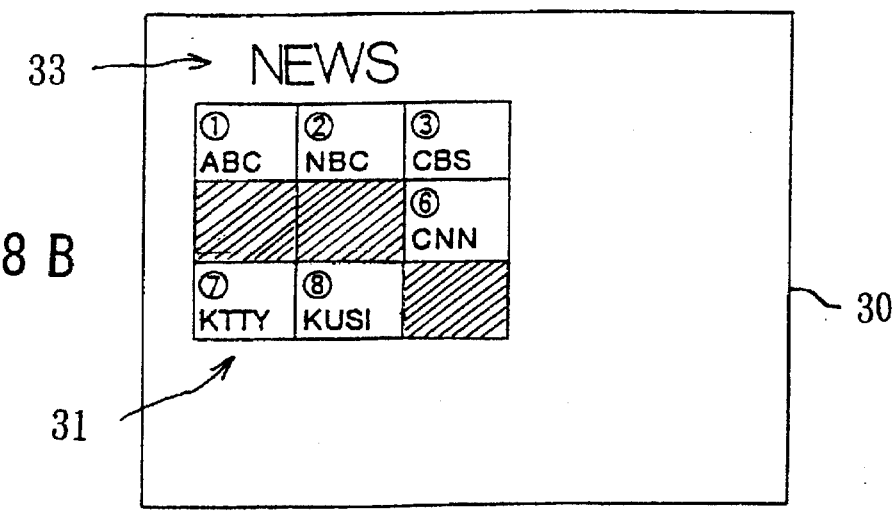
Figure 8C:
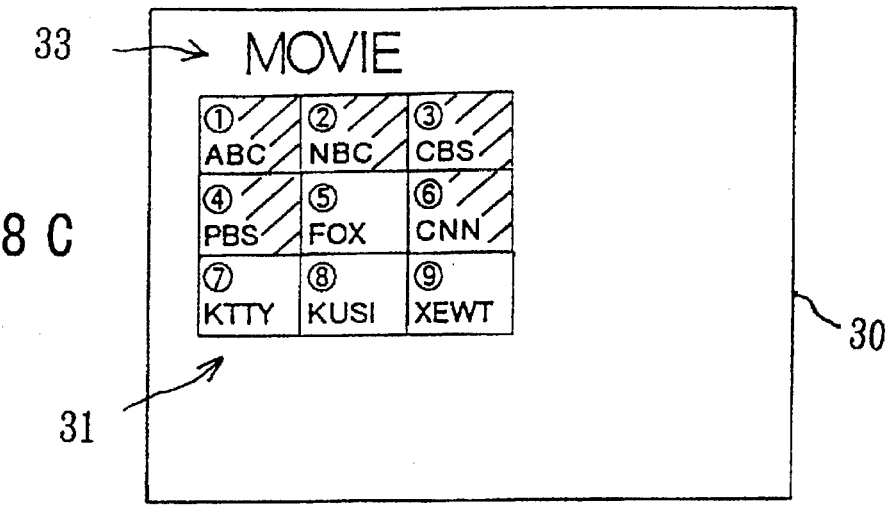

In FIGS. 8A to 8C, which show the same display mode as FIG. 5B, the broadcasting stations' names and the corresponding operation key numbers are displayed upon the channel selection screen 31, and the type of the program e.g., news, movie, or drama is displayed upon the program type display portion 33 which is located on the upper side of the channel selection screen 31. For example, as shown in FIG. 8A, "SPORT" (which indicates sports type programs) is displayed on the program species display portion 33, and the channels which correspond to this program type and which are on the air at present, are allocated to all screens of the channel selection screen 31.

First, the CPU 2 analyzes the program content related information which is contained in the image information in the information signal analyzing circuit 12, and then writes this analyzed information into the storage device 14. Next, the CPU 2 reads the information related to the type of program which has been selected and specified by the user and then controls the channel selecting circuit 4 or 5. By doing this, the CPU 2 can detect the channels which correspond to the type of the program content from the multiple received channels. On the basis of the detected result, the video signal SYC is output from the input change-over switch circuit 8, and the image displaying position signal SZ is output from the multiple channel display circuit 11. As a result, the above-described detected channels are allocated to the channel selection screen 31, and images of them are displayed. Next, the CPU 2 sends the information related to the type of the program which has been selected by the user along with the character information which has been read from the ROM 17, and the position information for displaying this, to the character information displaying circuit 13. The character information displaying circuit 13 in turn sends the information signal SNG to the video signal processing circuit 10 on the basis of this information.

By superimposing the information signal SNG upon the video signal SYC and the image displaying position signal SZ, the video signal processing circuit 10 can display the predetermined character information etc. and the program type on the channel selection screen 31 and the program type display portion 33, in such a way as to multiplex those upon the display images of the above described detected channels which are currently being displayed on the channel selection screen 31. As a result, the channels corresponding to the type of program which has been selected and specified by the user are displayed on the display screen 30. Thereafter, the user can select the desired channel by pushing the operation key 24 of the remote commander 23 (FIG. 2) which corresponds to the character information while looking at the stated character information and the type of the program contents which have been displayed on the channel selection screen 31 and the program type display portion 33.

In the case where the program detection processing by the CPU 2 has been performed and multiple channels are displayed upon the channel selection screen 31 on the display screen 30, for instance, "NEWS", which designates that news programs are being displayed on the program type display portion 33, as shown in FIG. 8B, only those channels which are on-air at present and of which are the type which correspond to news programs are displayed on a part of the channel selection screen 31. The channels of which type are different from news programs are blanked or not displayed, (the shaded portions of the figure). Alternatively, as seen in FIG. 8C, "MOVIE" which designates movie programs, is displayed on the program type display portion 33. Only those channels which are on-air at present and of which type correspond to movie programs are displayed on a part of the channel selection screen 31. The channels of which type are different from this program type have been displayed on the screen with reduced brightness (the shaded portions of the figure). Thus, where the type of program displayed changed successively by operating, for instance, toggle switches, the manipulation which is required for the user can be simplified since the program type display portion 33 is always being displayed.

(4) Channel Selection Processing by the CPU Based on Frequency of Selection

In the television signal receiving apparatus 1 which again is able to display images of multiple channels and also to display the broadcasting station's name in such a manner that their position corresponds to the image display position of each channel, the CPU 2 performs the following channel selection processing based on the order of the frequency of selection. As a result, some of the transmitted channels which have been specified by the user can be displayed on the display screen 30 in descending order of the user's selection frequency, by collecting the statistics of the channel numbers which have been viewed by the user at particular specified times (e.g., a day of the week, a period of time) for a predetermined duration, and then storing them in the storage device 14.

Figure 9:
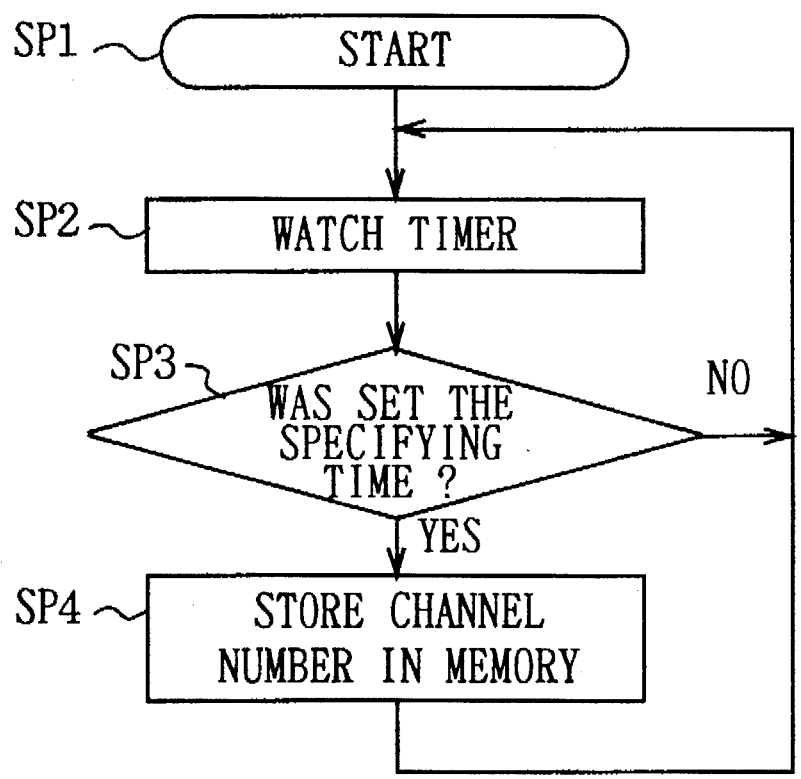
FIG. 9 is a flow chart showing the procedure for storing channel numbers.

FIG. 9 shows the procedure for storing the channel numbers in the storage device 14. After the watch timer status, that is, after the time setting status has been determined at step SP2, the CPU 2 proceeds to step SP3 and decides whether the user has set the specifying time or not. If an affirmative result is obtained in step SP3, the CPU 2 proceeds to step SP4 and stores the channel numbers of the channels which are transmitted at the time which has been specified by the user for the stated period in the storage device 14. The CPU then collects the statistics regarding these channels and proceeds to step SP2 again. However, if a negative result is obtained at step SP3, then the CPU 2 returns to step SP2.

Figure 10:
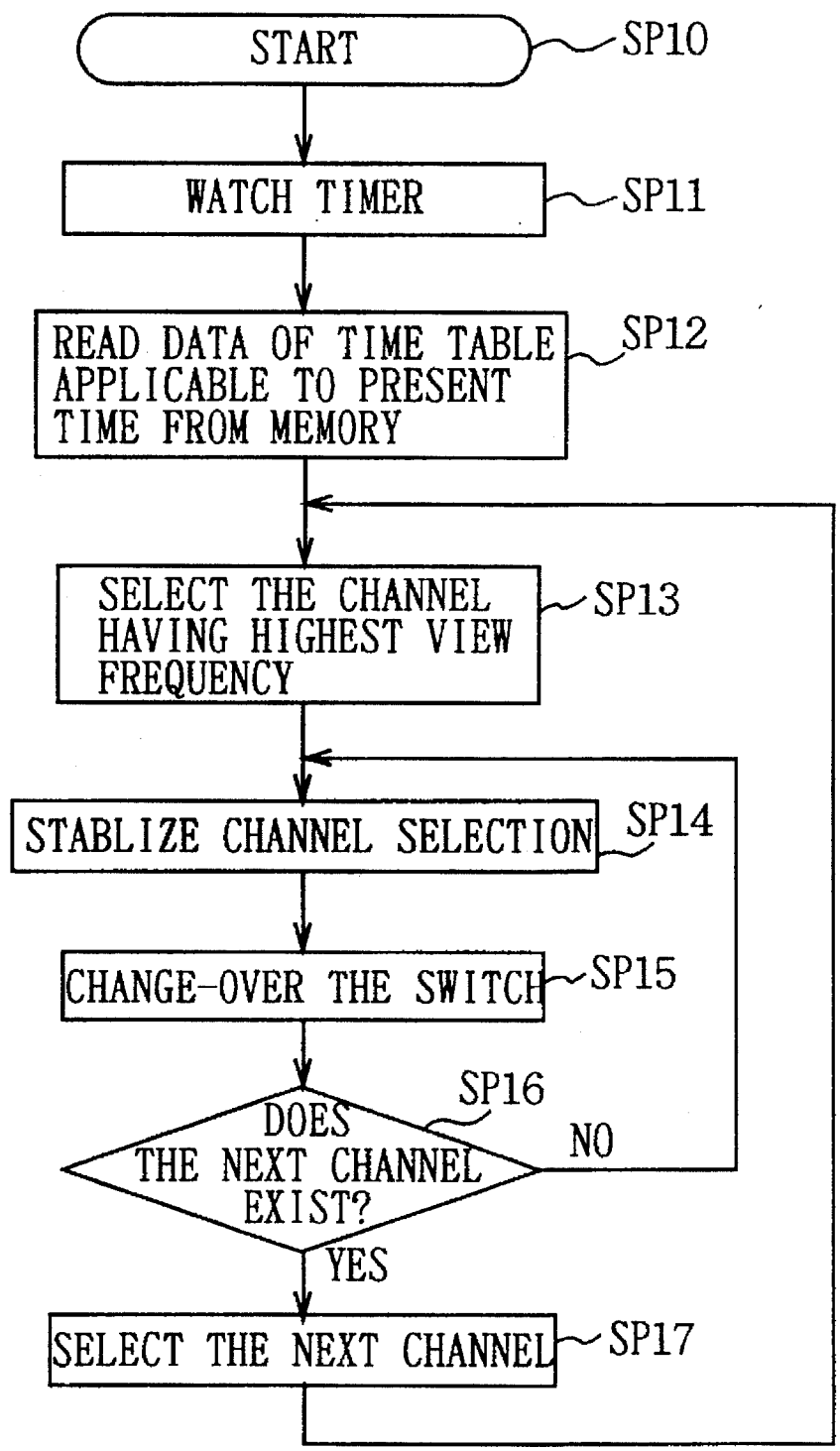
FIG. 10 is a flow chart showing the procedure for displaying the channel selection screen.

FIG. 10 shows the procedure for displaying the channels on the channel selection screen 31. After the watch timer status step SP11, the CPU 2 proceeds to step SP12 and reads the data of the time table which is applicable to the present time from the storage device 14. After this, the CPU 2 proceeds directly to step SP 13 and selects the channel having the highest viewing frequency out of the channels transmitted at the present time, and then proceeds to step SP 14.

The CPU 2 causes this selected channel to go to the channel selection stabilized status at step SP14, then proceeds to step SP 15 and controls the switch change-over to display the channel on the channel selection screen 31, and then proceeds to step SP16. At step SP16, the CPU 2 decides whether the channel which has the following higher viewing frequency is available or not. If the affirmative result is obtained at this point, then the CPU 2 proceeds to step SP17 to select the following channel, and then proceeds to step SP 13. However, if a negative result is obtained at step SP16, then the CPU 2 returns to step SP14. Thereby the user is able to easily select the channels which correspond to the program contents which have been most frequently viewed.

(5) Process in the Case where an External Channel Selecting Device is Connected

In the case where information which is related to the broadcasting stations' names and the program contents are multiplexed with the broadcasting signal or transmitted through a dedicated channel, and where a cable box (a device which is comprised of a tuner and a decoder which have been accommodated to CATV) is connected as the external channel selecting device 9 (FIG. 4), the external channel selecting device 9 cannot usually be connected to the television signal receiving apparatus as will be explained below.

Figure 11A:
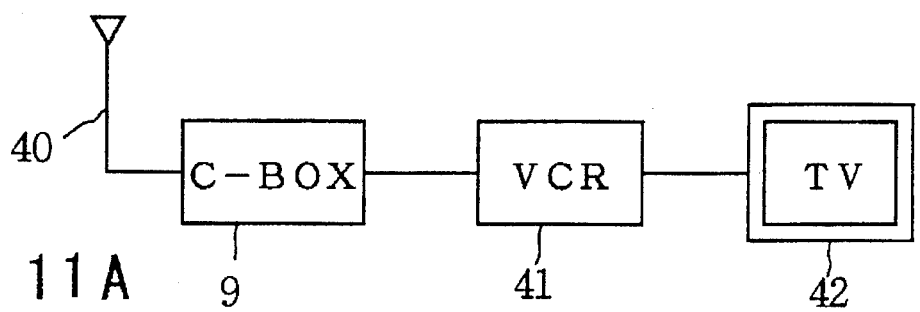
FIGS. 11A and 11B are block diagrams showing the external channel selecting devices.

When the information signals of the multiple channels have been input to the external channel selecting device 9 via the cable 40 as shown in FIG. 11A for example, the external channel selecting device 9 selects only one channel out of these multiple channels and then outputs it. Therefore, the information signals of all the channels are not output to the VCR 41 and TV 42 from the external channel selecting device 9, and the channel selection screen is not displayed on the TV 42.

Figure 11B:
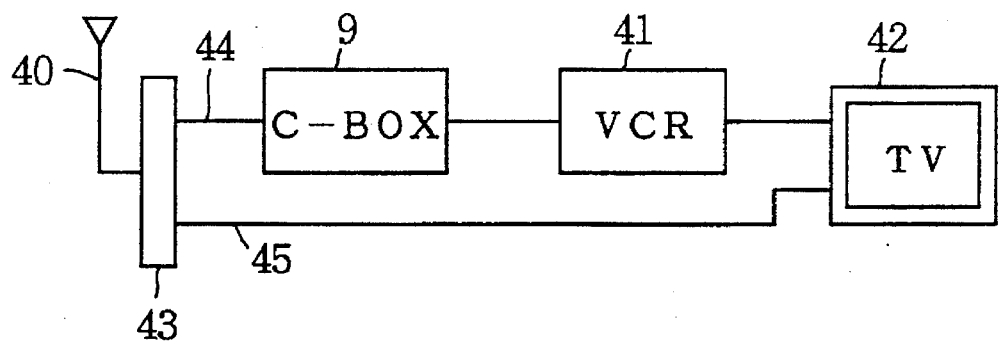

In order to resolve this problem, as shown in FIG. 11B, a distribute circuit 43 is also connected between the external channel selecting device 9 and the cable 40. A cable 44 is connected from the distribute circuit 43 to the external channel selecting device 9 and a cable 45 is connected from the distribute circuit 43 directly to the TV 42. Thus, the information signals which are output to the television signal receiving apparatus 1 (FIG. 4) of the TV 42 via the cable 45 can be output as information signals of multiple channels, because they are not passed through the external channel selecting device 9.

The signals which have been not yet been input to the external channel selecting device 9 are thus input directly into the television signal receiving apparatus 1; therefore, the information of each channel etc. can be extracted from the input signals. As a result, the extracted information is stored in the storage device 14 in such a manner that a channel number which has been located in the signal which has been not yet input to the external channel selecting device 9 corresponds to the video signal which is output when the CPU 2 has controlled the external channel selecting device 9.

In this connection, in accordance with one embodiment of the present invention, when the channel selection display processing by the CPU 2 is performed, a channel which is being selected at present by the external channel selecting device 9 is displayed, and an oscillating device for controlling external devices (not shown) is provided in order that the channel-selection on the external channel selecting device 9 is controlled by the television signal receiving apparatus 1.

Next, where the channel selecting device which is not being used (e.g., those instances where multiple channel selecting devices are provided, where the television is not being watched, or where the television signal receiving apparatus is in stand-by status, etc.), or where the information signal analyzing circuit is not being used, the information signals can be constantly analyzed, and stored or updated by utilizing the channel selecting device and information signal analyzing circuit. In this way the time required for selection of the channels which are to be displayed on the channel selection screen 31 can be shortened. More specifically, as the television signal receiving apparatus 1 may receive the information signal on its two input terminals (not shown), in the case where the television signal receiving apparatus is in stand-by status at one input terminal, by controlling the information signal analyzing circuit 12 via the CPU 2, the information signal can be constantly analyzed, and stored or updated. In this regard, if the information is analyzed at the time of displaying on the channel selection screen 31, it is required to select the stated number of channels out of all receivable channels and then analyze the information. As a result, much time is needed to select the images and display them. On the other hand, in the case where the information relates to the broadcasting stations' names and the program contents are multiplexed with the broadcasting signal or transmitted through a dedicated channel, and where the dedicated channel selecting device and/or analyzing device for obtaining information is provided, the same effect as the aforementioned one can be also obtained.

(6) Operations and Effects of the Embodiments

In the above construction, the information which has been extracted from the coded information which has been multiplexed with the broadcasting signal or the information signal which has been transmitted through the private signal channel, is written in the storage device 14 via the CPU 2. This is then utilized to display the character information such as the broadcasting stations' names in such a manner that it is superimposed upon the displayed images of the multiple channels displayed on the display screen 30 and caused to correspond to the image display position of each channel.

In this way, according to the above construction, in the television signal receiving apparatus 1 for receiving, analyzing, and displaying the broadcasting signal etc. which is multiplexed with the information signal such as the broadcasting stations' names, the information which has been obtained by analyzing the information signal is stored in the storage device, so that the information can be displayed in such a manner that it corresponds with the displayed images of the multiple channels. As a result, the various channel selecting methods which are suited to the contents of the character information and/or the images can be realized.

(7) Other Embodiments

Figures 1, 3:
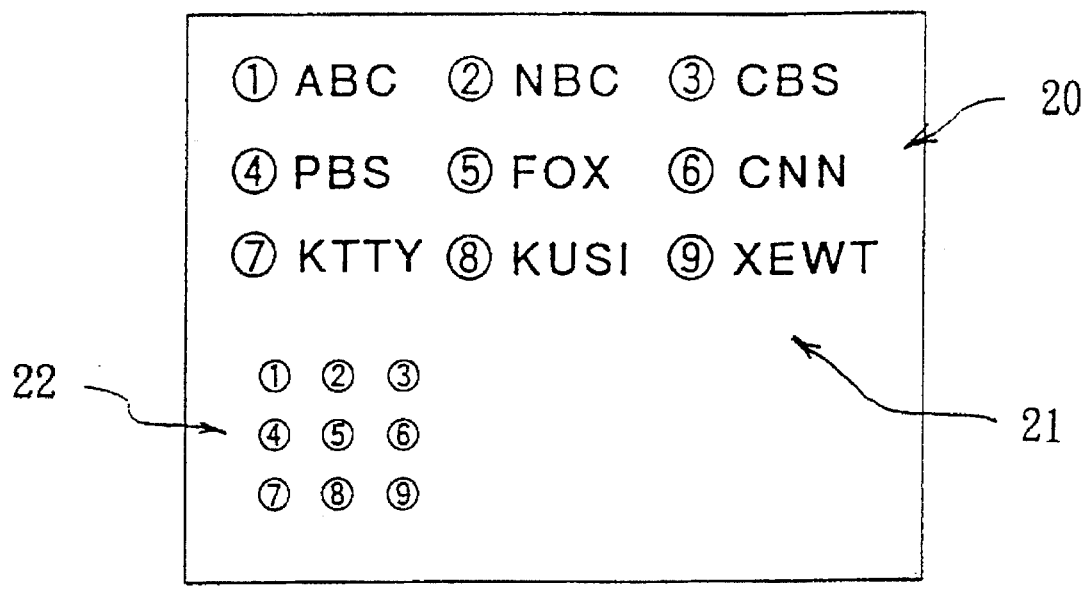
FIGS. 1 and 2 are schematic diagrams show conventional channel selecting display screens.
FIG. 3 is a schematic diagram show construction of a remote commander.

The embodiments described above have dealt with the case where the display screen 30 is divided into nine screens in FIGS. 12A and 12B, and FIGS. 6A to 6C and FIGS. 7A to 7C. The selected channels are allocated to these nine screens, and their images are displayed. In this case, the same effect as the effects of FIGS. 6A to 6C and FIGS. 7A to 7C is obtained. FIG. 12A represents the case where the broadcasting stations' names and/or the corresponding operation key numbers have been displayed in such a manner that they are superimposed upon the images of the nine screens. FIG. 12B represents the case where the broadcasting stations' names have been displayed in such a manner that they are superimposed upon the images of the nine screens. In this connection, heretofore, it has been proposed that the display screen 25 is divided into 3 columns×3 rows, that is nine screens, in which the selected channels are allocated to this nine screens respectively and the images are displayed on this nine screens, and in which only the channel numbers are displayed in such a manner that they are superimposed upon the image displays, as shown in FIG. 3. Further, the embodiments discussed above have dealt with the case where the channel selection screen 31 is divided into nine screens of 3 columns×3 rows. However, the present invention is not to be limited to such a case, but the channel selection screen can be divided into sixteen screens of 4 columns×4 rows etc. or any number of multiple screens.

Further, the embodiments discussed above have dealt with the case where FIGS. 8A to 8C have the same display mode as the display mode of FIG. 5B. Of course, the present invention is not to be limited to such a case, but is possible for FIGS. 8A to 8C to have the display shown in any one of FIGS. 5A to 5C, FIGS. 7A to 7C or FIGS. 12A to 12B.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A television signal receiving apparatus comprising:

receiving means for receiving information signals including predetermined information, said information signals being multiplexed onto a predetermined broadcast wave and transmitted;

display means for displaying image information corresponding to a plurality of broadcast channels Which are transmitted as broadcast waves;

analyzing means for analyzing said information signals and for extracting said predetermined information, storing means for storing said predetermined information which has been extracted by said analyzing means; and, display control means for superimposing said predetermined information stored in said storing means upon said image information displayed on said display means;

wherein said predetermined information includes program content-related information indicating a program type of each of said broadcast channels, wherein said image information which corresponds to those of said broadcast channels of a program type selected by a user is displayed on said display means with a first brightness, wherein said image information which corresponds to those of said broadcast channels not of said program type selected by the user is displayed on said display means with a second brightness, and wherein said second brightness is less than said first brightness.

2. A television signal receiving apparatus comprising:

receiving means for receiving information signals including predetermined information, said information signals being multiplexed onto a predetermined broadcast wave and transmitted;

display means for displaying image information corresponding to a plurality of broadcast channels which are transmitted as broadcast waves;

analyzing means for analyzing said information signals and for extracting said predetermined information;

storing means for storing said predetermined information which has been extracted by said analyzing means; and, display control means for superimposing said predetermined information stored in said storing means upon said image information displayed on said display means;

wherein each of said broadcast channels has a broadcast channel number, and said storing means stores said broadcast channel numbers at a specified time for a predetermined duration and collects statistics with respect to it, and wherein said display control means displays said image information which corresponds to said broadcast channel having a high usage frequency on said display means on the basis of said statistics.

3. An information displaying method in a television signal receiving apparatus comprising the steps of:

receiving information signals including predetermined information, said information signals being multiplexed onto a predetermined broadcast wave and transmitted;

displaying image information corresponding to a plurality of broadcast channels which are transmitted as broadcast waves;

analyzing said information signals and extracting said predetermined information;

storing said predetermined information which has been extracted in said analyzing step; and, superimposing said predetermined information upon said image information displayed on a display;

wherein said predetermined information includes program content-related information indicating a program type of each of said broadcast channels, wherein said image information which corresponds to those of said broadcast channels of a program type selected by a user is displayed on said display means with a first brightness, wherein said image information which corresponds to those of said broadcast channels not of said program type selected by the user is displayed on said display means with a second brightness, and wherein said second brightness is less than said first brightness.

4. An information displaying method in the television signal receiving apparatus comprising the steps of:

receiving information signals including predetermined information, said information signals being multiplexed onto a predetermined broadcast wave and transmitted;

displaying image information corresponding to a plurality of broadcast channels which are transmitted as broadcast waves;

analyzing said information signals and extracting said predetermined information;

storing said predetermined information which has been extracted in said analyzing step; and, superimposing said predetermined information upon said image information displayed on a display;

wherein each of said broadcast channels has a broadcast channel number, and said storing step stores said broadcast channel numbers at a specified time for a predetermined duration and collects statistics with regard to it, and wherein said superimposing step further includes displaying said image information corresponding to the broadcast channel having a high usage frequency on said display on the basis of said statistics.

5. A television signal receiving apparatus comprising:

receiving means for receiving information signals including predetermined information, said information signals being multiplexed onto a predetermined broadcast wave and transmitted;

display means for displaying image information corresponding to a plurality of broadcast channels which are transmitted as broadcast waves;

analyzing means for analyzing said information signals and for extracting said predetermined information;

storing means for storing said predetermined information which has been extracted by said analyzing means; and, display control means for superimposing said predetermined information stored in said storing means upon said image information displayed on said display means;

wherein said predetermined information includes program content-related information indicating a program type of each of said broadcast channels, wherein said image information which corresponds to those of said broadcast channels of a program type selected by a user is displayed with a first brightness, and wherein said image information which corresponds to those of said broadcast channels not of said program type selected by the user is displayed with a second brightness and wherein said second brightness is different from said first brightness.

6. An information displaying method in a television signal receiving apparatus comprising the steps of:

receiving information signals including predetermined information, said information signals being multiplexed onto a predetermined broadcast wave and transmitted;

displaying image information corresponding to a plurality of broadcast channels which are transmitted as broadcast waves;

analyzing said information signals and extracting said predetermined information;

storing said predetermined information which has been extracted in said analyzing step; and, superimposing said predetermined information upon said image information displayed on a display;

wherein said predetermined information includes program content-related information indicating a program type of each of said broadcast channels, wherein said image information which corresponds to those of said broadcast channels of a program type selected by a user is displayed with a first brightness, and wherein said image information which corresponds to those of said broadcast channels not of said program type selected by the user is displayed with a second brightness and wherein said second brightness is different from said first brightness.

* * * * *